(12) United States Patent
Frerich et al.

(10) Patent No.: US 11,549,752 B2
(45) Date of Patent: Jan. 10, 2023

(54) COOLER FOR COOLING HOT BULK MATERIAL AND METHOD FOR PREVENTING GRATE RIDDLINGS IN A COOLER

(71) Applicants: thyssenkrupp Industrial Solutions AG, Essen (DE); thyssenkrupp AG, Essen (DE)

(72) Inventors: Daniel Frerich, Lippstadt (DE); Rolf Rieger, Bielefeld (DE); Norbert Avermann, Ahlen (DE); Matthias Dowe, Ahlen (DE); Justin Bisping, Warendorf (DE)

(73) Assignees: THYSSENKRUPP INDUSTRIAL SOLUTIONS AG, Essen (DE); THYSSENKRUPP AG, Essen (DE)

( * ) Notice: Subject to any disclaimer, the term of this patent is extended or adjusted under 35 U.S.C. 154(b) by 8 days.

(21) Appl. No.: 17/269,391

(22) PCT Filed: Sep. 6, 2019

(86) PCT No.: PCT/EP2019/073864
§ 371 (c)(1),
(2) Date: Feb. 18, 2021

(87) PCT Pub. No.: WO2020/053098
PCT Pub. Date: Mar. 19, 2020

(65) Prior Publication Data
US 2021/0302099 A1    Sep. 30, 2021

(30) Foreign Application Priority Data

Sep. 11, 2018 (DE) ..................... 10 2018 215 406.6

(51) Int. Cl.
*F27D 15/02* (2006.01)
*F27B 7/38* (2006.01)
*C04B 7/47* (2006.01)

(52) U.S. Cl.
CPC ............... *F27B 7/383* (2013.01); *C04B 7/47* (2013.01); *F27D 15/0213* (2013.01)

(58) Field of Classification Search
CPC .... F27B 15/02; F27B 19/00; F27B 2009/007; F27B 7/38; F27B 7/383; F27B 7/40; F26B 17/26; F23H 7/08; F23K 3/10
See application file for complete search history.

(56) References Cited

U.S. PATENT DOCUMENTS

| | | | |
|---|---|---|---|
| 6,796,141 B2 | 9/2004 | Kaestingschaefer | |
| 6,920,702 B2 * | 7/2005 | Meyer | B65G 25/00 34/236 |

(Continued)

FOREIGN PATENT DOCUMENTS

| | | |
|---|---|---|
| DE | 100 18 142 B | 10/2001 |
| DE | 101 17 226 A | 10/2002 |

(Continued)

OTHER PUBLICATIONS

English Translation of International Search Report issued in PCT/EP2019/073864, dated Nov. 8, 2019.

*Primary Examiner* — Gregory A Wilson
(74) *Attorney, Agent, or Firm* — thyssenkrupp North America, LLC

(57) ABSTRACT

A cooler for cooling bulk material such as cement clinker may include a stationary aeration grate that is for receiving the bulk material is passably by a flow of cooling gas, a conveyor unit having conveyor planks that are disposed above the aeration grate and that for transporting the bulk material are movable in a reciprocating manner in a conveying direction and counter to the conveying direction, a (Continued)

seal assembly that prevents grate riddlings and is attached to the stationary aeration grate, and a drive element that drives the conveyor planks and extends through the stationary aeration grate. The seal assembly may lie against the drive element, and spacing between the seal assembly and the drive element may be adjustable. Further, a method for preventing grate riddlings in a cooler may involve in the event of wear decreasing the spacing between the seal assembly and the drive element.

15 Claims, 4 Drawing Sheets

(56) References Cited

U.S. PATENT DOCUMENTS

| | | | | |
|---|---|---|---|---|
| 7,114,612 | B2 * | 10/2006 | Meyer | F26B 17/26 198/750.2 |
| 7,886,457 | B2 * | 2/2011 | Dikty | F27D 15/0213 34/236 |
| 9,903,657 | B2 * | 2/2018 | Fruehling | F27D 17/004 |
| 2004/0222068 | A1 | 11/2004 | Meyer | |
| 2007/0259298 | A1 * | 11/2007 | Splinter | F27B 7/38 432/77 |
| 2010/0270750 | A1 * | 10/2010 | Schinke | F27D 15/0213 277/412 |
| 2017/0016674 | A1 * | 1/2017 | Fruehling | F27D 17/004 |

FOREIGN PATENT DOCUMENTS

| | | | | |
|---|---|---|---|---|
| DE | 21 2004 000 003 U | | 4/2005 | |
| DE | 20 2004 020 573 U | | 8/2005 | |
| DE | 10 2006 037 765 A | | 2/2008 | |
| DE | 10 2015 217 228 A | | 3/2017 | |
| EP | 0 664 427 A1 | | 7/1995 | |
| EP | 2 290 311 A | | 3/2011 | |
| EP | 2434241 A1 * | | 3/2012 | F27B 7/383 |
| EP | 2 021 692 B | | 12/2012 | |
| WO | 98/48 231 A | | 10/1998 | |

* cited by examiner

COOLER FOR COOLING HOT BULK MATERIAL AND METHOD FOR PREVENTING GRATE RIDDLINGS IN A COOLER

CROSS REFERENCE TO RELATED APPLICATIONS

This application is a U.S. National Stage Entry of International Patent Application Serial Number PCT/EP2019/073864, filed Sep. 6, 2019, which claims priority to German Patent Application No. DE 10 2018 215 406.6, filed Sep. 11, 2018, the entire contents of both of which are incorporated herein by reference.

FIELD

The present disclosure generally relates to coolers for cooling hot bulk material such as cement clinker.

BACKGROUND

For cooling hot bulk material such as, for example, cement clinker, it is known for the bulk material to be deposited on an aeration grate of a cooler that is able to be passed through by a flow of cooling gas. For cooling, the hot bulk material is subsequently moved from one end of the cooler to the other end and herein passed through by a flow of cooling gas.

Various possibilities are known for transporting the bulk material from the beginning of the cooler to the end of the cooler. In a so-called reciprocating grate cooler the transportation of the bulk material takes place by movable conveyor elements which move in the conveying direction and counter to the conveying direction. The conveyor elements have a thrust edge that transports the material in the conveying direction.

A cooler which has a plurality of conveyor elements which are movable in the conveying direction and counter to the conveying direction is known from DE 100 18 142 B4. Each of the conveyor elements is connected to suitable transport mechanisms by way of a support element which mounts the conveyor elements so as to be movable on a machine frame structure. The material is transported in the conveying direction by a suitable movement pattern with a forward stroke and a reverse stroke.

A cooler which has a plurality of conveyor elements that are movable in the conveying direction and counter to the conveying direction is known from EP 2021692 B2. The conveyor elements are attached to a frame structure which by way of bearings is mounted on the machine frame. The conveyor elements have a shape that enables the transportation in the conveying direction.

On account of the movements of the cooler elements relative to one another, it often arises during the operation of the cooler that bulk material to be cooled drops through the cooling grate (grate riddlings) and negatively influences the functionality of the mechanical components of the cooler, for example. Extensive wear on the drive elements likewise often arises during the operation of the cooler on account of the relative movement.

Thus, a need exists for a cooler which has a low incidence of grate riddlings and simultaneously protects the drive elements against wear.

DETAILED DESCRIPTION

Figure 1:
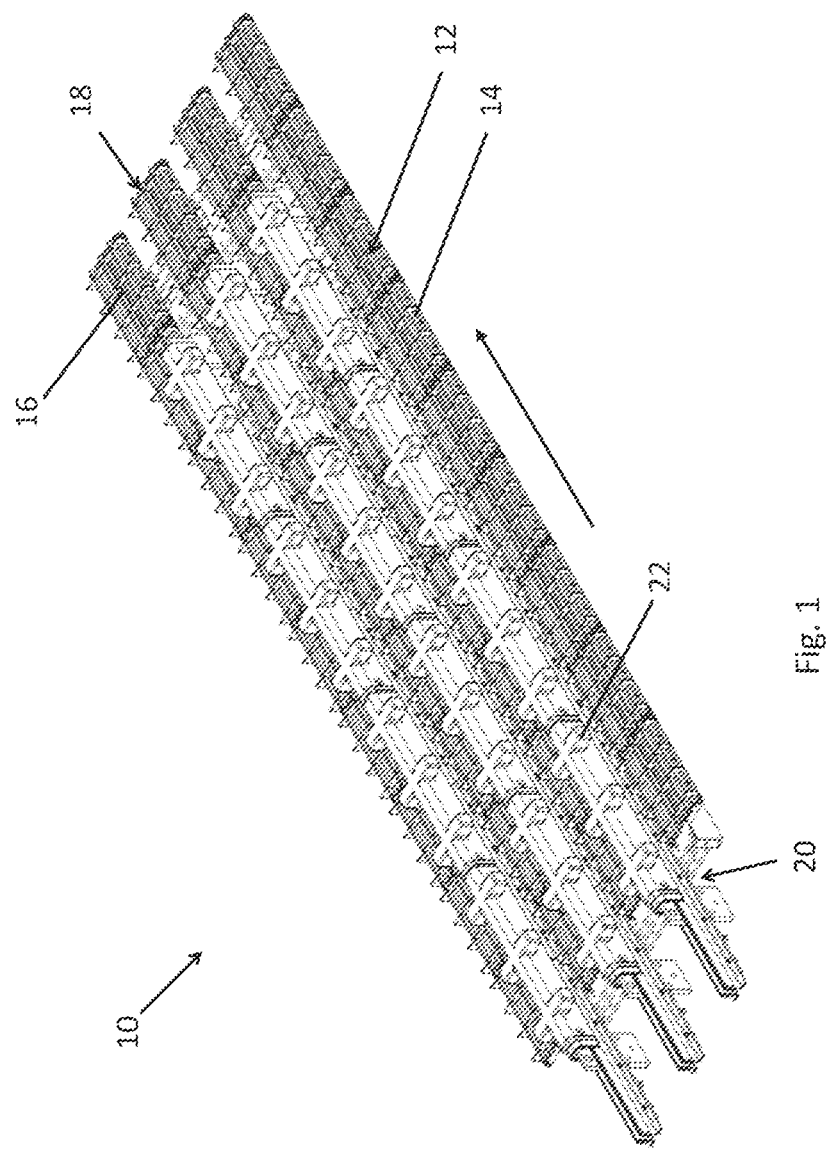
FIG. 1 is a schematic perspective plan view of a fragment of an example cooler.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

According to a first aspect of the invention, a cooler for cooling bulk material, in particular cement clinker, comprises a stationary aeration grate which for receiving the bulk material is able to be passed by a flow of cooling gas; at least one conveyor unit having conveyor planks which are disposed above the aeration grate and for transporting the bulk material are movable in a reciprocating manner in the conveying direction and counter to the conveying direction; and a seal assembly for preventing grate riddlings; wherein the cooler for driving the conveyor planks has at least one drive element which extends through the aeration grate. The stationary seal assembly is attached to the aeration grate. The seal assembly simultaneously lies against the drive element, wherein the spacing between the seal assembly and the drive element is adjustable.

Such a cooler is preferably disposed downstream of a kiln for firing cement clinker. The conveyor planks are preferably attached so as to be movable relative to the aeration grate and have entrainment elements which extend transversely to the conveying direction and ensure improved transportation of the bulk material, for example. The cooling gas is preferably cooling air which, for example by means of ventilators, flows from below through the aeration grate. The aeration grate preferably has a plurality of air passages which are configured in such a manner that cooling gas is able to flow through the latter but bulk material lying on the aeration grate is prevented from dropping through said air passages. The air passages are formed by profiles which lie on top of one another and prevent grate riddlings, for example.

The seal assembly serves for preventing grate riddlings in a region between the aeration grate and the drive element, wherein the drive element conjointly with the conveyor planks moves relative to the aeration grate. The drive element is preferably connected to a drive installation such as, for example, an actuator and extends through a clearance in the aeration grate. The seal assembly lies against the drive element, on account of which friction between the drive element and the seal assembly arises during the operation of the cooler and wear takes place on the seal assembly. The spacing of the seal assembly from the drive element is preferably adjustable in a stepless manner. In the event of wear on the seal assembly, this enables a gap between the seal assembly and the drive element to be closed in a simple manner and to thus prevent bulk material dropping through the aeration grate by way of the clearance through which the drive element extends.

According to a first embodiment, the stationary seal assembly has a wall element, and the spacing between the wall element and the drive element is adjustable. The wall element is configured so as to be plate-shaped, for example, and according to a further embodiment is connected to the aeration grate by way of a releasable connection means, in particular a screw.

According to a further embodiment, an elongate hole in which the connection means is disposed is provided in the aeration grate. The stepless adjustment of the spacing between the seal assembly, in particular the wall element, and the drive element is enabled on account thereof. The elongate hole extends in particular in the direction of the drive element, preferably transversely to the conveying direction.

According to a further embodiment, the wall element is configured so as to be L-shaped and has an angle of approximately 60°-120°, preferably 75°-105°, in particular 90°-100°. The wall element preferably has two legs which have one of the afore-mentioned mutual angles. One of the legs is in particular fastened to the aeration grate, wherein the other leg lies against the drive element.

According to a further embodiment, the seal assembly has a wear-protection element which is attached to the wall element. The wear-protection element is preferably disposed between the wall element and the drive element, and the wear-protection element lies against the drive element. According to a further embodiment, the wear-protection element has at least one plate.

According to a further embodiment, the wear-protection element comprises hard metal such as tungsten carbide. The wear-protection element comprises an overlay welding or is configured by metal spraying or flame spraying, for example. The wear-protection element preferably comprises a ceramic coating, a carbide coating, and/or steel.

According to a further embodiment, each conveyor plank is connected to a plurality of drive elements. The drive elements are preferably disposed so as to be uniformly spaced apart from one another and across the length of the cooler. The drive elements are in particular in each case connected to a drive installation and a conveyor board and therefore serve for transmitting the drive output from the drive installation to the conveyor unit. According to a further embodiment, the drive element is configured so as to be plate-shaped.

According to a further embodiment, each drive element extends through a respective clearance in the aeration grate. Each clearance preferably receives exactly one drive element. A plurality of drive elements in respective clearances in the aeration grate ensures a lower incidence of grate riddlings since the clearances do not extend across the entire length of the cooler. Additionally, the friction between the seal assembly and the drive element is decreased. According to a further embodiment, the clearance is configured so as to be slot-shaped and has a length that corresponds to that of the length of the stroke of the conveyor unit. On account thereof, the length of the clearance is kept ideally minor, this additionally preventing grate riddlings.

The invention also relates to a method for preventing grate riddlings in an afore-described cooler, wherein in the event of wear the spacing between the seal assembly and the drive element is decreased. The event of wear is in particular the wear on the seal assembly, preferably on the wall element or the wear-protection elements. The spacing is preferably decreased in such a manner that the seal assembly lies against the drive element. In particular, the screw connections between the wall element and the aeration grate are released, the wall element is subsequently moved in the direction of the drive element, and the screw connections are subsequently fastened in the respective elongate hole of the aeration grate.

FIG. 1 shows a fragment of a cooler 10 having an aeration grate 12. The aeration grate 12 has a grate having a plurality of air passages 14 through which cooling gas, in particular cooling air, can flow from the bottom to the top. The aeration grate 12 has a plurality of parallel grate planks 18, in an exemplary manner four grate planks 18, which in each case have a plurality of cooling grates 16 that are disposed behind one another. The grate planks 18 are disposed so as to be mutually spaced apart, wherein one conveyor plank 20 is in each case disposed between two neighboring grate planks 18. The cooler 10 has a conveyor unit having a plurality of parallel conveyor planks 20, wherein only three conveyor planks 20 are illustrated in the fragment of FIG. 1. In an exemplary manner, each conveyor plank 20 extends along the entire extent of the aeration grate 12 and has a plurality of entrainment elements 22 that extend transversely to the conveying direction and are uniformly spaced apart from one another. The conveying direction in an exemplary manner is illustrated with an arrow.

The cooler 10 of FIG. 1 is a cooler which operates according to the reciprocating conveyor principle, wherein the conveyor planks 20 are attached so as to be movable relative to the stationary aeration grate 12. During the operation of the cooler 10, the conveyor planks 20 are simultaneously moved in the conveying direction and non-simultaneously moved counter to the conveying direction, preferably according to the "walking floor principle". This overall results in a movement of the bulk material lying on the conveyor planks 20 and the aeration grate 12 in the conveying direction, since the conveyor planks that are individually moved back do not cause any conveying of the bulk material.

Figure 2:
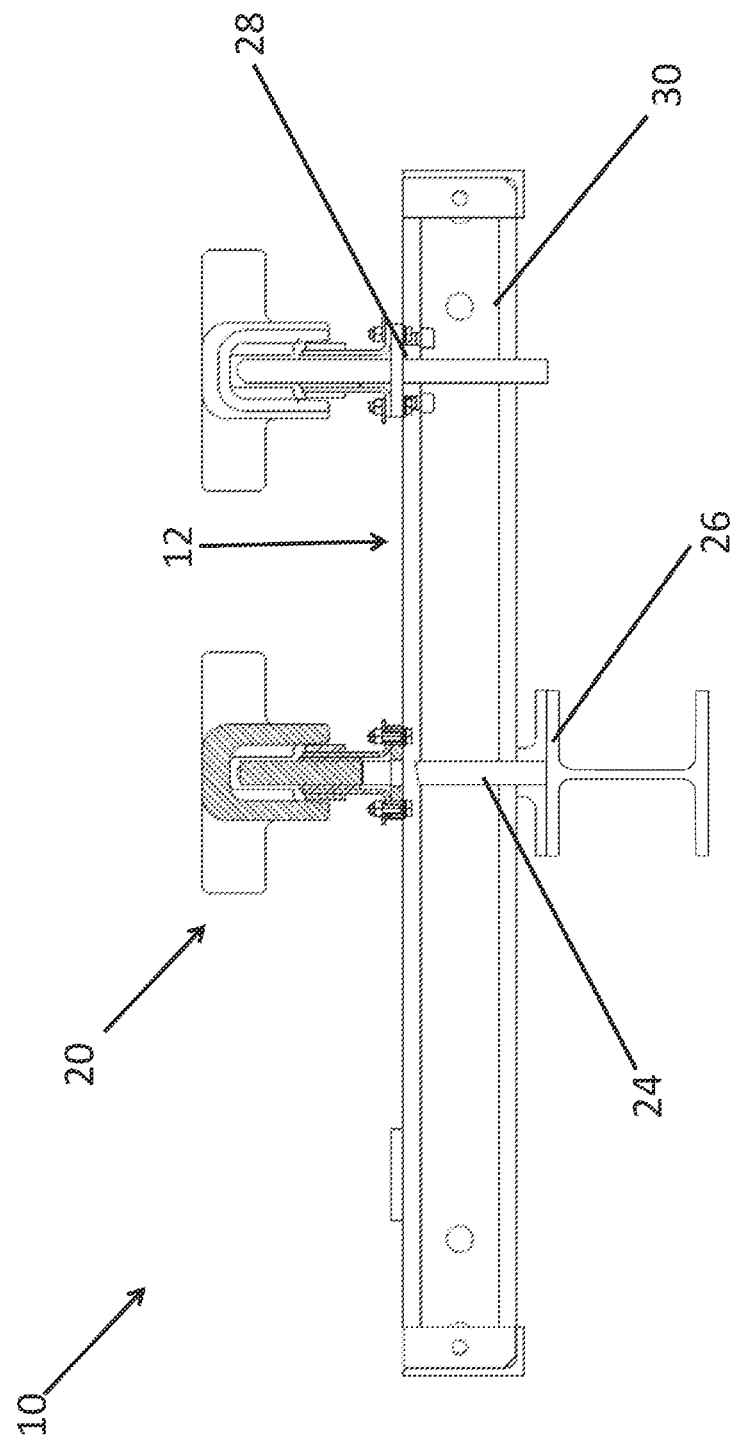
FIG. 2 is a schematic front view of a cooler from FIG. 1.
Figure 3:
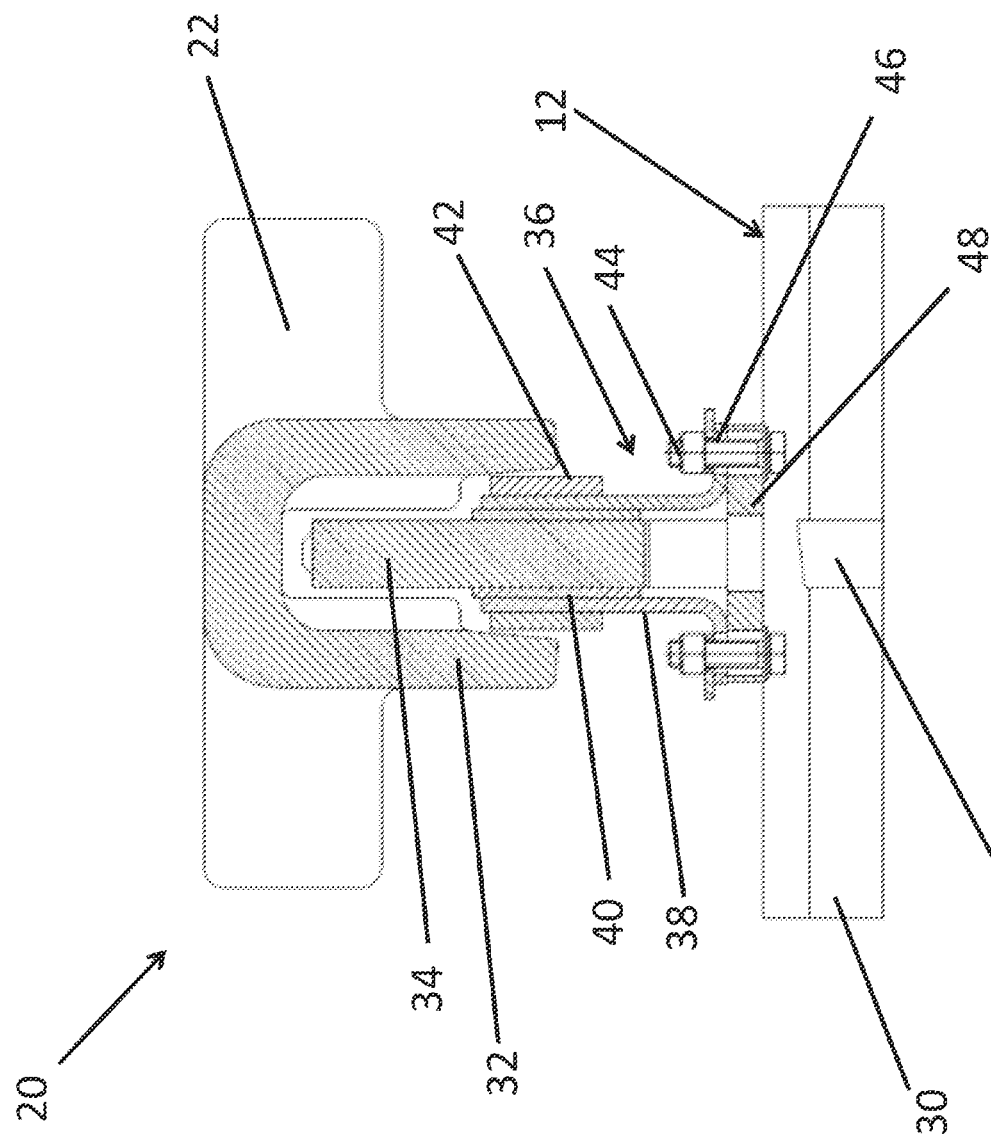
FIG. 3 is a schematic cross-sectional view of an example seal assembly.

FIG. 2 shows a front view of the cooler 10, wherein two conveyor planks 20 are illustrated in an exemplary manner, one conveying plank 20 being illustrated in a sectional view. A detailed view of the sectioned conveyor installation 20 is illustrated in FIG. 3. FIG. 2 furthermore shows a drive element 24 which extends through the aeration grate 12 and forms a connection between the conveyor plank 20 and a drive support 26. The drive support 26 is disposed below the aeration grate 12 and is connected to a drive such as, for example, an actuator which is not illustrated. Each conveyor plank 20 is preferably assigned one drive support 26, wherein the drive support 26 extends parallel to the conveyor plank 20. A plurality of drive elements 24 which are uniformly spaced from one another, for example, are attached to the drive support 26. The drive elements 24 are preferably configured so as to be plate-shaped or rod-shaped and in particular from a metal. Each drive element 24 extends through a respective clearance 28 in the aeration grate 12. The aeration grate 12 in the exemplary embodiment of FIG. 2 in an exemplary manner comprises a supporting floor 30 which preferably receives bulk material dropping through the cooling grate 16 which is not illustrated in FIG. 2. The drive element 24 extends in particular through the aeration grate 12 and the supporting floor 30 lying below the latter.

FIG. 3 shows a detailed illustration of the cross-sectional view of the conveyor plank 20. The conveyor plank 20 has a casing 32 which is substantially U-shaped and on which the entrainment elements 22 are disposed. The casing 32 preferably extends across the entire length of the conveyor plank 20. An intermediate element 34 which at least partially fills the cavity within the U-shaped casing 32 is disposed within the casing 32. The intermediate element 34 in the conveying direction of the cooler 10 preferably extends between two drive elements 24 and is in particular fixedly connected to the drive elements 24. The casing 32 is in particular fixedly connected to the drive element 24, for example by means of a bolt or a screw connection.

FIG. 3 also shows a seal assembly 36 for preventing bulk material dropping through the clearances 28 in the aeration grate, in particular during a movement of the conveyor planks 20 relative to the aeration grate 12. The seal assembly 36 comprises a stationary wall element 38 which is fixedly connected to the aeration grate 12. In an exemplary manner, the wall element 38 is screwed to the aeration grate 12. The aeration grate 12 in an exemplary manner comprises a plate 48 which is disposed between the supporting floor 30 and the wall element 38 and to which the wall element 38 is screwed. The plate 48 preferably serves as a support element for fastening the wall elements 38 and in particular simplifies the assembling of the seal assembly 36. The wall element 38 is preferably configured as an angle and is substantially L-shaped. The wall element 38 has in particular two legs which are mutually disposed at an angle of approximately 60-120, preferably 80-100°, in particular 90°. The seal assembly 36, preferably by way of only one leg of the wall element 38, lies against the drive element 24 and/or the intermediate element 34 such that no bulk material can drop through between the seal assembly 38 and the drive element 24 and/or the intermediate element 34. At least one wear-protection element 40 which is disposed between the wall element 38 and the drive element 24 or the intermediate element 34 is attached to the wall element 38. The wall element 38 preferably has a second wear-protection element 42 which is attached opposite the first wear-protection element 40. The second wear-protection element 42 is disposed between the wall element 38 and the U-shaped casing 32 and during a movement of the conveyor plank 20, and thus a movement of the casing 32, relative to the wall element 38 prevents wear on the wall element 38. The wear-protection elements 40, 42 preferably extend along the entire wall element 38, wherein it is likewise conceivable for a plurality of wear-protection elements 40, 42 to be disposed beside one another in the longitudinal direction of the wall element 38.

The wall element 38 of the seal assembly 36 extends in particular along the entire length of the conveyor plank 20. Each conveyor plank 20 has at least two seal assemblies 36, for example, which are disposed on each side of the drive element 24 or of the intermediate element 34. Seal assemblies 36 are disposed opposite one another such that at least one drive element 24 extends between two seal assemblies 36. Each seal assembly 38 is releasably fastened to the aeration grate 12, for example by means of a screw 44. The screws 44 are in each case disposed in an elongate hole 46 which extends in the direction of the drive element 24. In the event of wear on the wear-protection elements 40, 42 it is thus possible for the wall elements 38 of the seal assemblies 36 to be displaced in the direction of the drive element 24.

Figure 4:
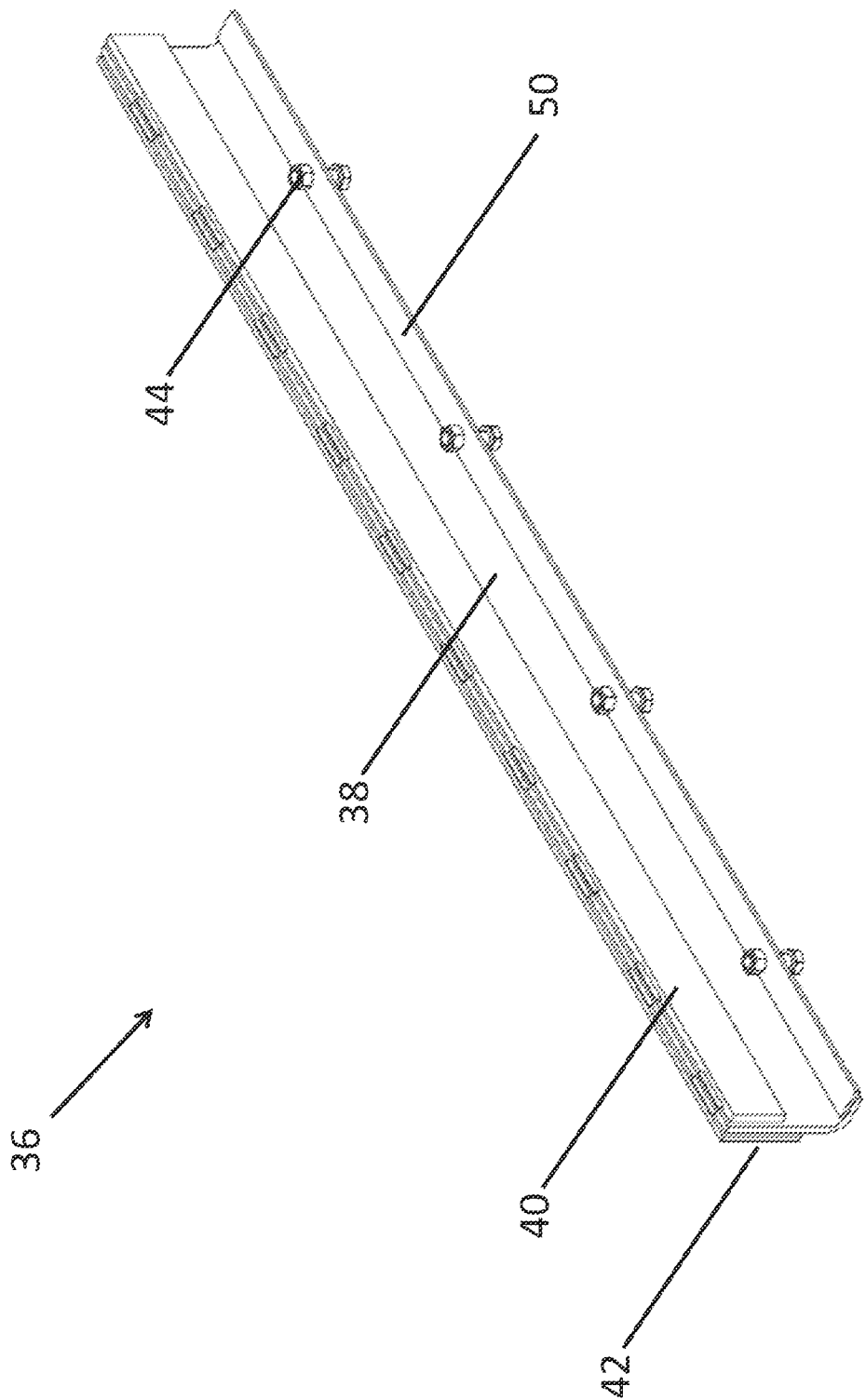
FIG. 4 is a schematic perspective view of an example seal assembly.

FIG. 4 shows a seal assembly 36 having a wall element 38 with a first horizontal and a second vertical leg. One wear element 40, 42 is in each case attached on both lateral faces on the vertical leg. In an exemplary manner, the seal assembly 36 is fastened to the aeration grate 12 by means of four screws 44 which are uniformly spaced apart from one another in an elongate hole (not illustrated). A support plate 50 which preferably extends along the entire length of the wall element 38 is disposed in an exemplary manner on the wall element 38. The support plate 50 preferably serves as support pad for the screws 44.

LIST OF REFERENCE SIGNS

10 Cooler
12 Aeration grate
14 Air passages
16 Cooling grate
18 Grate plank
20 Conveyor plank
22 Entrainment element
24 Drive element
26 Drive support
28 Clearance in the aeration grate
30 Supporting floor
32 Casing
34 Intermediate element
36 Seal assembly
38 Wall element
40 First wear-protection element
42 Second wear-protection element
44 Screw
46 Elongate hole
48 Plate
50 Support plate

What is claimed is:

1. A cooler for cooling bulk material, the cooler comprising:
   a stationary aeration grate for receiving the bulk material, wherein the stationary aeration grate is passable by a flow of cooling gas;
   a conveyor unit having conveyor planks that are disposed above the stationary aeration grate and that for transporting the bulk material are movable in a reciprocating manner in a conveying direction and counter to the conveying direction;
   a drive element for driving the conveyor planks, the drive element extending through the stationary aeration grate; and
   a seal assembly for preventing grate riddlings, the seal assembly being stationary and being attached to the stationary aeration grate by way of a releasable connection means and laying against the drive element, wherein spacing between the seal assembly and the drive element is adjustable by way of the releasable connection means.

2. The cooler of claim 1 wherein the seal assembly includes a wall element, wherein spacing between the wall element and the drive element is adjustable.

3. The cooler of claim 2 wherein the wall element is connected to the stationary aeration grate by way of the releasable connection means.

4. The cooler of claim 3 wherein the stationary aeration grate includes an elongate hole through which the releasable connection means is disposed.

5. The cooler of claim 2 wherein the wall element is L-shaped and has an angle of 60° to 120°.

6. The cooler of claim 2 wherein the seal assembly includes a wear-protection element that is attached to the wall element.

7. The cooler of claim 6 wherein the wear-protection element includes a plate.

8. The cooler of claim 6 wherein the wear-protection element comprises a hard metal.

9. The cooler of claim 6 wherein the wear-protection element comprises at least one of tungsten carbide or ceramics.

10. The cooler of claim 1 wherein each of the conveyor planks includes drive elements.

11. The cooler of claim 10 wherein each of the drive elements extends through a respective clearance in the stationary aeration grate.

12. The cooler of claim 1 wherein the drive element extends through a clearance in the stationary aeration grate.

13. The cooler of claim 1 wherein the drive element is plate-shaped.

14. The cooler of claim 13 wherein the drive element extends through a clearance in the stationary aeration grate, wherein the clearance is slot-shaped and has a length that corresponds to a length of a stroke of the conveyor unit.

15. A method for preventing grate riddlings in the cooler of claim 1, wherein the method comprises decreasing the spacing between the seal assembly and the drive element to reduce or eliminate wear.

* * * * *